March 19, 1973 R. MACDUFF 3,798,295
PROCESS FOR BLOW MOLDING CONTAINERS UTILIZING DOUBLE PINCH
Filed Nov. 6, 1972 3 Sheets-Sheet 1

RICHARD MacDUFF
*INVENTOR*

BY *Sheldon F. Raye*
*ATTORNEY*

RICHARD MacDUFF
INVENTOR

United States Patent Office 3,798,295
Patented Mar. 19, 1974

3,798,295
PROCESS FOR BLOW MOLDING CONTAINERS
UTILIZING DOUBLE PINCH
Richard MacDuff, Newark, Del., assignor to Hercules Incorporated, Wilmington, Del.
Continuation-in-part of abandoned application Ser. No. 102,692, Dec. 30, 1970. This application Nov. 6, 1972, Ser. No. 304,285
Int. Cl. B29c 17/07
U.S. Cl. 264—99        3 Claims

ABSTRACT OF THE DISCLOSURE

Containers are made from a continuous oriented crystalline mono-α-olefin tubing. Orientation of the tubing is effected by heating the crystalline tubing in an oven to a few degrees below its crystalline melting point and then stretching or orienting the tubing in an axial direction. A first mold is closed about a length of tubing and internal pressure is applied to expand the tubing within the mold to form a container. The mold is then moved away from the oven at a rate which is faster than the rate that the tubing is emerging from the oven thereby stretching or orienting a length of the tubing. A second mold then closes on the newly oriented length of tubing and proceeds in the same manner as the first mold which opens and discharges its container after the second mold closes. A double pinch is utilized at the rear of the mold to prevent "blow-back" of air pressure past the first pinch into the tubing in the oven and is also utilized to prevent pulling material away from the first pinch area due to the magnitude of force required to orient the tubing.

---

This is a continuation-in-part of U.S. patent application Ser. No. 102,692 filed Dec. 30, 1970, now abandoned.

This invention concerns a process for making containers comprising solid polymers of mono-α-olefins containing up to 6 carbon atoms which have high degrees of crystallinity, for example, high density ethylene polymers and isotactic polypropylene, poly-4-methyl pentene-1, polybutene and the like.

A crystalline mono-α-olefin is a very strong material. In order to effectively orient a crystalline mono-α-olefin, the temperature should preferably be below the crystalline melting point thus requiring a significant force to orient the same. When a continuous blow molding process is utilized, the molds are utilized to effect orientation of the tubing. This is done by moving the molds at a rate which is faster than the rate that the continuous tubing emerges from an oven. The force required to pull the tubing for orientation tends to pull material away from a pinch area in the mold thus depriving a container of necessary material at that area. Furthermore, when the material is pinched, a hot melt seal does not readily occur resulting in air pressure, applied to expand the tubing within the mold, leaking past the pinch and causing premature expansion of that portion of the tubing which is either in the oven or adjacent the mold. This latter condition is hereinafter referred to as a "blow-back" problem.

In view of the above, it is the primary object of this invention to provide a continuous process for blow molding oriented crystalline mono-α-olefin tubing into containers which includes utilizing a double pinch for eliminating the "blow-back" problem and the problem of pulling material from the pinch area of a mold when orienting the tubing.

Figure 1:
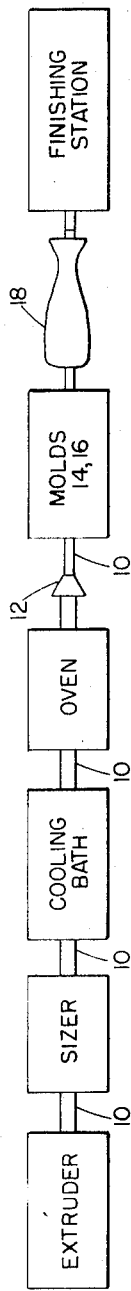
Figure 2:
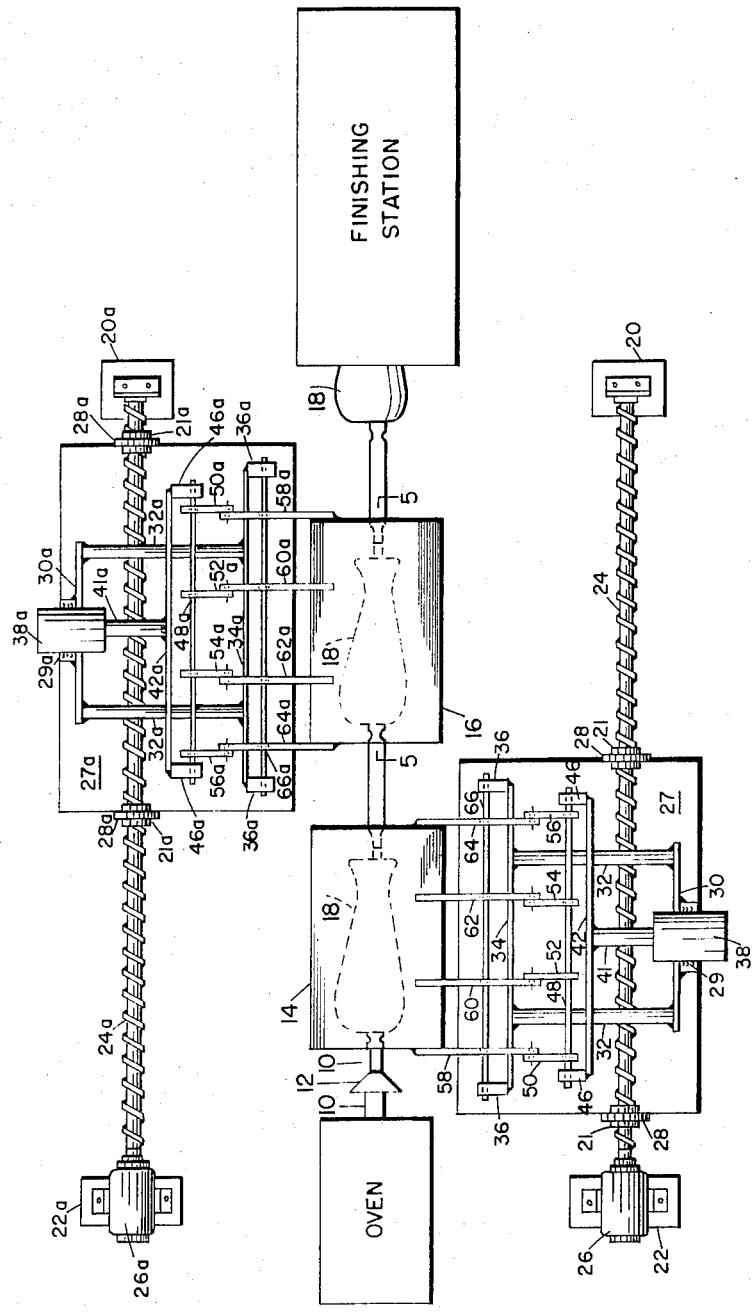
Figure 3:
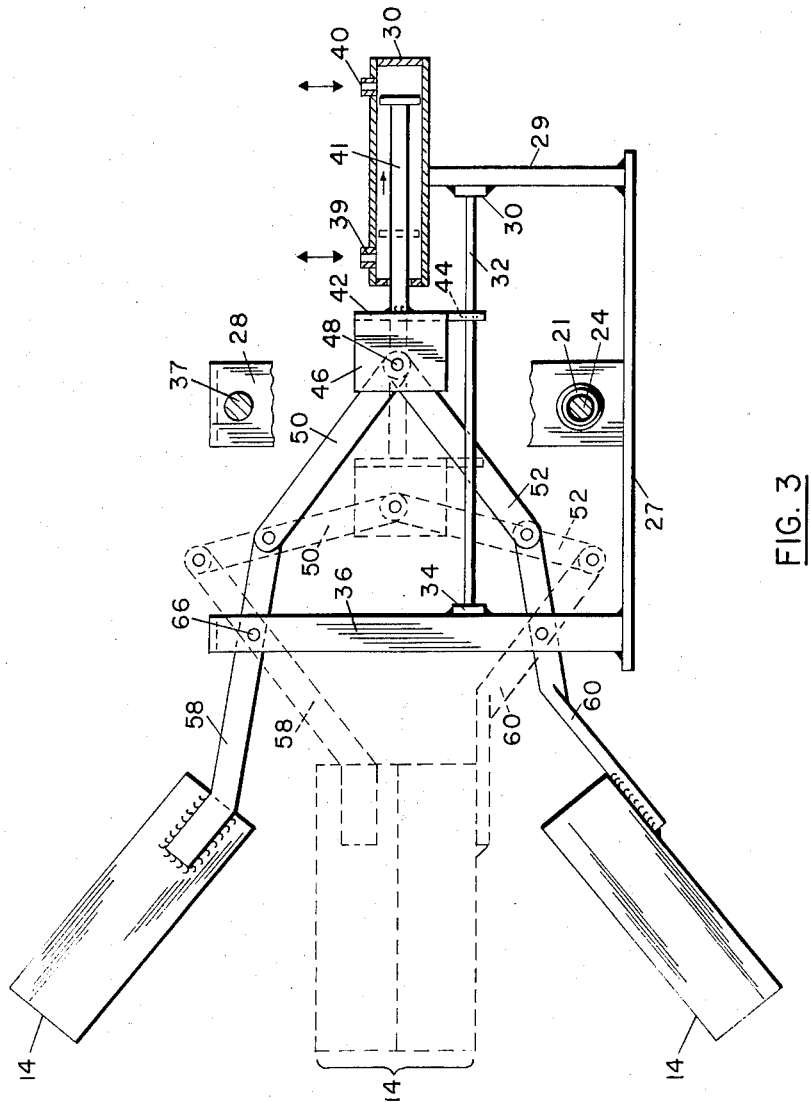
Figure 4:
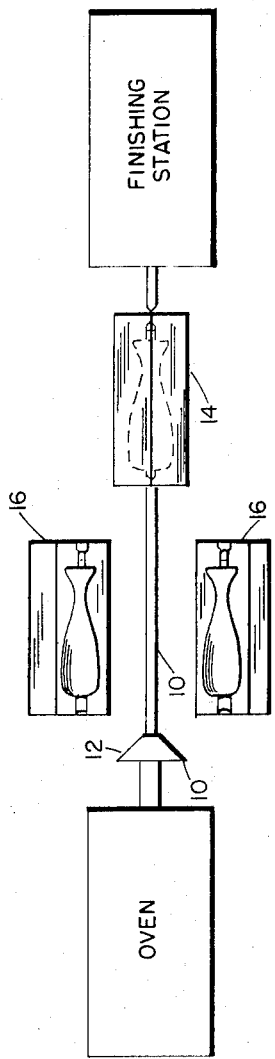
Figure 5:
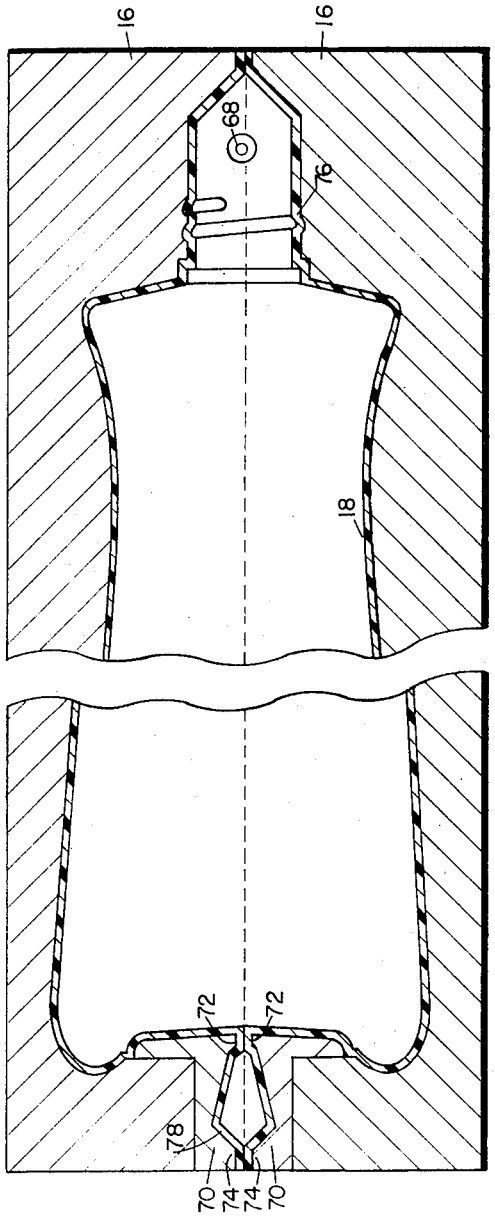

Other objects of this invention will become apparent from the following description with reference to the drawings wherein:

FIG. 1 is a flow diagram of the process;

FIG. 2 is a plan view of a pair of molds and the apparatus for operating the same;
FIG. 3 is an end view of one of the molds and the actuating mechanism therefor;
FIG. 4 is a view of the molds when one mold is in the closed position and moving to orient the tubing and the other mold is in its return stroke; and
FIG. 5 is a view taken along section line 5—5 of FIG. 2.

Referring to the flow diagram of FIG. 1, an extruder is utilized to extrude a tube 10 preferably made of polypropylene. The tube passes through a sizer and then a cooling bath where the tube is cooled below the crystalline temperature. In the case of polypropylene, the tube is cooled to about 120° C. to hasten crystallization. The tube 10 is drawn from the extruder through the sizer and cooling bath by a driven set of opposed tires (not shown). The tube 10 is reheated in an oven to a few degrees below the crystalline melting point (about 140° C.–167° C.) and after being reheated, passes through a restrictor cone 12 to molds 14 and 16 which alternately grip the tube 10 and move away from the oven to stretch the same through the cone 12 to orient the tube. Each of the molds is communiucated with a source of pressure which is utilized to expand the tube inside the mold to form a container 18. The container 18 proceeds to a finishing station where it is separated from the other containers and the flash removed.

Referring to FIGS. 2 and 3, support members 20 and 22 are provided with each support 20 having an internally threaded bushing 21 receiving one end of a rotatable threaded shaft 24 and each support 22 having a reversible motor 26 fixed thereto receiving the other end of the threaded shaft 24. A longitudinally movable mold carriage is provided and comprises a platform 27, a pair of longitudinally spaced plates 28 fixed to the platform 27, plate 29 fixed to the platform 27, a bar 30 secured to the plate 29, and guide bars 32 which are secured to bar 34 which is in turn secured to a pair of longitudinally spaced plates 36. A carriage guide bar 37 extends parallel to and above the threaded shaft 24 and is fixed to the supports 20 and 22. The bar 37 is not shown in FIG. 2 in the interest of maintaining clarity. As shown in FIG. 3, the bar 37 passes through supports 28 to slidably guide the carriage structure. A hydraulic cylinder 38 having ports 39 and 40 is secured to the plate 29 and has a piston rod 41 slidable therein. Attached to the piston rod 41 is a slidable plate 42 secured thereto which has openings 44 through which the bars 32 extend for slidably guiding the plate 42. Flanges 46 are secured on each end of the plate 42 and a shaft 48 is secured to the flanges 46. A plurality of links 50, 52, 54, and 56 are pivotally mounted at one end to the shaft 48 and pivotally secured at the other end to lever arms 58, 60, 62, and 64, respectively. The lever arms are pivotally conected intermediate the ends thereof to a stationary shaft 66 secured to the upper half of the mold and the other end of levers 58 and 64 are secured to the lower half of the mold for opening and closing the same.

The mold is closed from the open position illustrated in FIG. 3 by introducing pressure into cylinder 30 through port 40 thereby moving the piston rod 41 forward to slide the plate 42 on guide bars 32 forward as well as the link pivot shaft 48. Forward movement of the pivot shaft 48 pivots the links 50, 52, 54, and 56 in a clockwise direction about their pivotal connections with the respective lever arms which in turn causes the lever arms 58, 60, 62, and 64 to pivot counterclockwise about the shaft 66 to close the mold as shown in phantom in FIG. 3. Introduction of pressure into port 39 of the cylinder 30 causes the piston rod 41 to move in the opposite direction causing the links and levers to move from the phantom position to the mold open position shown in full in FIG. 3. The mold is moved in a longitudinal direction away or towards the oven by actuating the motor 26 to rotate the threaded shaft 24 through the threaded connection thereof with the bushing 21 forcing the whole mold carriage structure to slide along guide shaft 37 either away from or towards the oven depending upon the direction of rotation of its respective shaft. The description for the actuating mechanism for the mold 16 is the same as that for mold 14 with the reference numerals therefor being the same only with an "a" affixed thereto.

The system for introducing air pressure into the molds opening and closing the molds, and operating the threaded shafts for moving the molds, all in proper sequence, comprises limit switches, air-brake contactors, solenoid valves and timers all of which are well known and do not form any part of this invention.

In operation, FIG. 2 illustrates the molds both in closed position with a bottle 18 being formed in mold 16 which is ready to be opened. The mold 14 has just closed about a length of tubing 10 and a bottle 18 has been formed therein by communication of air pressure into the tube through a blow pin 68 (FIG. 5), located in the mold and penetrating the tubing. The cylinder 38a is actuated to open mold 16 and the motor 26 is rotating shaft 24 in a counterclockwise direction to move mold 14 forward away from the oven at a faster rate than the rate the tubing 10 is emerging from the oven. The mold 14 grips the tube 10 to pull the same through a restrictor cone 12 and stretch or orient a length of the tubing to about 2½ to 4 times its original length in the longitudinal direction. As the mold 14 moves forward, motor 26a is actuated to rotate the shaft 24a in a clockwise direction to move the mold 16 back towards the oven where it takes a position adjacent a length of oriented tubing as shown in FIG. 4. At this position the motor 26a is stopped, reversed to rotate the shaft 24a counterclockwise to move the mold 16 away from the oven and then cylinder 38a actuated to close the mold on the tubing to form another bottle. The cylinder 38 is then actuated to open the mold 14 and then motor 26 is reversed to rotate the shaft 24 in a clockwise direction to return the mold 14 towards the oven to again repeat the same cycle. The bottle 18 from mold 14 then passes to the finishing station.

Referring to FIG. 5, a sectional view of the closed mold 16 is shown. The main cavity is in the shape of the bottle 18. A pair of pinch inserts 70 are secured to a respective half of the molds and each has a pair of axially spaced lands 72, 74 for effecting a double pinch on the tube when the molds are closed.

The blow pin 68 is located in the front portion of the mold above the portion of the mold conforming to the neck 76 of the botlte. The blow pin 68 is connected to a source of air pressure for providing the same at the proper time to expand the tube 10 within the mold against the walls thereof.

Since the tube is in its crystalline stage when air pressure is applied through the blow pin 68 to expand the tubing against the walls of the mold, one is not assured that a perfect seal on the tubing is formed by the pinch land 72 and therefore the second pinch land 74 is utilized to provide a backup or safety seal. This is desired during the application of air pressure to prevent "blow-back" or leakage of air pressure beyond the pinch lands 72 into the tubing that is in the oven and emerging from the oven. This "blow-back" of air pressure can cause premature expansion of the tubing prior to entering the mold and can disrupt the temperature uniformity of the oncoming tubing which are very undesirable.

When the molds move forward, the pinch lands 72 and 74 grip to pull and stretch or orient a length of the tubing in the axial direction. Since the tubing is in its crystalline phase, a substantial force (on the order of 25 pounds) is required to orient the same presenting a force tending to pull the tube away from the lands 72 and 74. If only one set of lands 72 were used, this force would pull material away from the pinch area in a rearward direction.

The provisions of an additional set of lands 74 provides extra gripping force on the tubing.

While one particular mold system has been described, a double pinch can also be utilized in other moving mold systems where the mold orients a crystalline tubing such as, for example, the system described in U.S. Pat. 3,288,317 (FIG. 3).

What is claimed is:

1. In a process for blow molding a container from oriented crystalline mono-α-olefin tubing including the steps of providing a crystalline polyolefin continuous tubing, drawing the tubing through an oven to heat the tubing to a few degrees below its crystalline melting point, closing a mold about a length of tubing after it emerges from the oven, applying fluid pressure within the tube portion inside the mold to expand the same to the contour thereof and then moving said mold forward away from the oven, stretching and orienting that portion of the tubing defined between the mold and oven, closing a second mold about the stretched portion of the tubing, applying fluid pressure within the tube portion inside said second mold to expand the same to the contour thereof and then moving said second mold forward away from the oven, continuously repeating the foregoing process, the improvement comprising:

pinching said tubing at a first point at the rear portion of the mold to seal the portion of the tube contained within the mold;

pinching said tubing at a second point at the rear portion of the mold axially spaced from said first point to provide a pull point in the mold for stretching and orienting the tubing emerging from the oven; and providing between said first and second points a length of tubing that can yield during the stretching and orienting of the tubing emerging from the oven caused on movement of the mold away from the oven to prevent damage to the expanded tubing in the mold.

2. The process as recited in claim 1 wherein the container is a bottle, the rear portion of said mold being of the configuration of a bottom of a bottle.

3. The process as recited in claim 2 wherein the mono-α-olefin is polypropylene.

References Cited

UNITED STATES PATENTS

| 2,810,934 | 10/1957 | Bailey | 264—98 |
| 3,592,885 | 7/1971 | Goins et al. | 264—98 |

FOREIGN PATENTS

| 1,103,318 | 2/1968 | Great Britain. |

OTHER REFERENCES

E. Overage and D. Burgess, "Successful Blow Moulding of High Density Polythenes," British Plastics, June 1963, pp. 328–334.

ROBERT F. WHITE, Primary Examiner

J. H. SILBAUGH, Assistant Examiner

U.S. Cl. X.R.

425—DIG. 216